(12) United States Patent
Seki

(10) Patent No.: US 7,553,033 B2
(45) Date of Patent: *Jun. 30, 2009

(54) PROJECTOR AND OPTICAL DEVICE

(75) Inventor: Hideya Seki, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 75 days.

This patent is subject to a terminal disclaimer.

(21) Appl. No.: 11/406,271

(22) Filed: Apr. 19, 2006

(65) Prior Publication Data

US 2006/0192924 A1 Aug. 31, 2006

Related U.S. Application Data

(63) Continuation of application No. 11/151,208, filed on Jun. 14, 2005, now Pat. No. 7,059,727, which is a continuation of application No. 10/826,409, filed on Apr. 19, 2004, now Pat. No. 6,953,251.

(30) Foreign Application Priority Data

Apr. 23, 2003 (JP) ............................. 2003-118402

(51) Int. Cl.
G03B 21/20 (2006.01)
G03B 21/28 (2006.01)

(52) U.S. Cl. .......................................... 353/85; 353/99
(58) Field of Classification Search .................. 353/30, 353/31, 37, 99, 85; 348/771, 687; 362/295
See application file for complete search history.

(56) References Cited

U.S. PATENT DOCUMENTS

| | | | |
|---|---|---|---|
| 5,668,611 A | 9/1997 | Ernstoff et al. | |
| 5,796,508 A | 8/1998 | Suzuki | |
| 5,903,323 A | 5/1999 | Ernstoff et al. | |
| 6,155,687 A | 12/2000 | Peterson | |
| 6,520,648 B2 | 2/2003 | Stark et al. | |
| 6,561,654 B2 | 5/2003 | Mukawa et al. | |
| 6,619,804 B2 * | 9/2003 | Davis et al. | 353/98 |
| 6,666,896 B1 | 12/2003 | Peng | |

(Continued)

FOREIGN PATENT DOCUMENTS

JP U-62-071642 4/1987

(Continued)

Primary Examiner—Christopher Mahoney
(74) Attorney, Agent, or Firm—Oliff & Berridge, PLC

(57) ABSTRACT

To provide a projector or the like, which use a solid-state light-emitting element as light source and which provides a bright, stable, and uniform projection image, the present invention includes: a light source to emit light; a spatial light modulator to modulate the light from the light source in accordance with an image signal; and a projector lens to project the light modulated by the spatial light modulator. The spatial light modulator is a tilt mirror device including a movable mirror element that reflects the light from the light source in the direction of the projector lens or in the direction other than that of the projector lens. The invention may further include a light-intensity measuring section provided in an imaging position of the light source or in the vicinity of the imaging position to measure the light intensity of the light reflected in the direction other than that of the projector lens; and a light-source controller to control the light source in accordance with the signal from the light-intensity measuring section.

17 Claims, 14 Drawing Sheets

U.S. PATENT DOCUMENTS

| | | |
|---|---|---|
| 6,707,596 B2 | 3/2004 | Tomiya |
| 6,713,754 B1 | 3/2004 | Mueller |
| 6,733,137 B2 | 5/2004 | Tomiya |
| 7,052,138 B2 * | 5/2006 | Matsui .................. 353/31 |
| 7,081,928 B2 | 7/2006 | Hubby |
| 7,088,321 B1 * | 8/2006 | Parker .................. 345/83 |
| 2005/0128441 A1 | 6/2005 | Morgan |

FOREIGN PATENT DOCUMENTS

| | | |
|---|---|---|
| JP | A-63-027073 | 2/1988 |
| JP | A-63-226079 | 9/1988 |
| JP | A-63-307784 | 12/1988 |
| JP | A-1-116692 | 5/1989 |
| JP | A-1-239969 | 9/1989 |
| JP | A-08-240779 | 9/1996 |
| JP | A-09-229818 | 9/1997 |
| JP | A-2000-066303 | 3/2000 |
| JP | A-2000-227561 | 8/2000 |
| JP | A-2001-133895 | 5/2001 |
| JP | 2001188196 A * | 7/2001 |
| JP | A-2003-015078 | 1/2003 |
| JP | A-2003-280090 | 10/2003 |
| WO | WO 02/080136 A1 | 10/2002 |

* cited by examiner

PROJECTOR AND OPTICAL DEVICE

This is a Continuation of application Ser. No. 11/151,208 filed Jun. 14, 2005 now U.S. Pat. No. 7,059,727, which is a Continuation of application Ser. No. 10/826,409 filed Apr. 19, 2004, now U.S. Pat. No. 6,953,251. The disclosures of the prior applications are hereby incorporated by reference herein in their entireties.

BACKGROUND OF THE INVENTION

1. Field of Invention

The present invention relates to a projector and, more particularly, to a projector and an optical device using a solid-state light-emitting element as light source.

2. Description of Related Art

Since solid-state light-emitting elements, such as light-emitting diode elements and semiconductor laser devices, have extremely high efficiency of converting electricity to light and are compact and lightweight, they have wide applicability in lighting. Related art or known methods of controlling the light intensity of the solid-state light-emitting elements include an electrical feedback method by constant-current driving or the like (for example, see JP-A-1-116692, JP-A-63-307784 and JP-A-63-226079) and a feedback control method by measuring light intensity (for example, see JP-A-1-239969, JP-U-62-071642 and JP-A-63-027073).

SUMMARY OF THE INVENTION

Projectors are devices that display images by projecting light (projection light) in accordance with image signals transmitted from image transmitters, such as computers. Solid-state light-emitting elements can be used as the light sources of the projectors. The projectors are required to be space-saving and portable, thus tending to be more compact and lightweight. Ultrahigh pressure mercury lamps which have been used as a light source can emit high-intensity light but require large and heavy drive circuits, thus preventing the downsizing and weight reduction of the projectors. Solid-state light-emitting elements are compact and lightweight and so the use of the solid-state light-emitting elements simplifies illumination optical systems. Accordingly, the use of the solid-state light-emitting elements as a light source promotes downsizing and weight reduction of the projectors. Some related art solid-state light-emitting elements have increased luminescence, long lifetime and low power consumption, thus being suitable for the light source of the projectors.

Spatial light modulators of projectors may use tilt mirror devices. One of the tilt mirror devices is a digital micromirror device (hereinafter "DMD") of Texas Instruments Inc. The DMD includes a movable mirror element that reflects light from a light source toward a projector lens or in the direction other than that of the projector lens. A Projector, which uses solid-state light-emitting elements as a light source and combines the solid-state light-emitting elements with a DMD, are not known.

It is desirable that the light of the light sources of the projectors be uniformly bright and stable in light intensity to project bright and stable projection images. When a plurality of solid-state light-emitting elements are used in the projectors to obtain sufficient light intensity, the variations in light intensity of the solid-state light-emitting elements cause non-uniform light intensity of the projection images. Therefore, the individual solid-state light-emitting element desirably has stable and uniform output.

When stabilizing and uniformizing the light intensity of the solid-state light-emitting elements used as the light sources of the projectors by using related art, the use of the solid-state light-emitting elements as the light sources of the projectors requires large outputs. The large outputs cause significant physical change of the solid-state light-emitting elements due to heat generation over their lifetime. The above-mentioned drive-current control method of stabilizing the output by the constant-current driving or sensing the electrical condition cannot cope with the physical changes of the solid-state light-emitting elements, having difficulty in sufficiently stabilizing the light quantity.

The control method of monitoring the light intensity of the solid-state light-emitting elements to control the drive current can cope with the change of the physical characteristics of the solid-state light-emitting elements over time. However, in the projector, when light-receiving elements to monitor light intensity are arranged near the light sources, the light is blocked off by the light-receiving elements to disadvantageously make the projection images dark. Also, when the light-receiving element to monitor light intensity is arranged in the vicinity of each of the solid-state light-emitting elements to stabilize the light intensity of each solid-state light-emitting element and to uniformize the luminance of the solid-state light-emitting elements, the structure becomes more complicated, making it difficult to dispose.

The present invention addresses the above and/or other problems. Accordingly, the invention provides a projector which uses a solid-state light-emitting element as light source and which provides a bright, stable, and uniform projection image.

In order to address or achieve the above, an aspect of the present invention provides a projector including: a light source to emit light; a spatial light modulator to modulate the light from the light source in accordance with an image signal; and a projector lens to project the light modulated by the spatial light modulator. The spatial light modulator is a tilt mirror device including a movable mirror element reflecting the light from the light source in the direction of the projector lens or in the direction other than that of the projector lens. The projector further includes: a light-intensity measuring section provided in an imaging position of the light source or in the vicinity of the imaging position to measure the light intensity of the light reflected in the direction other than that of the projector lens; and a light-source controller to control the light source in accordance with a signal from the light-intensity measuring section.

The projector that uses the tilt mirror device as a spatial light modulator includes a plurality of movable mirror elements to modulate light by reflecting incident light in the direction of a projector lens and in the direction other than that of the projector lens. The light reflected toward the projection lens forms a projection image, while the light reflected in the direction other than that of the projector lens is wasted. The light reflected in the direction other than that of the projector lens is measured by the light-intensity measuring section. The light source is controlled on the basis of the measured light intensity. The light from the light source is not directly measured in the vicinity of the light source. But the light reflected in the direction other than that of the projector lens by the spatial light modulator is measured. Accordingly, there is no need to dispose light-receiving elements functioning as a light-intensity measuring section in the vicinity of the light source. Since the light-receiving elements are not arranged in the vicinity of the light source, the optical path required to form a projection image is not blocked off by the light-receiving elements. Since the wasted light that is not used for image formation is used for light intensity measurement, the light to form a projection image is not lost even during image projection. Accordingly, a projector is provided in which the light source can provide stable light intensity without decreasing the brightness of a projection image and which provides a bright and stable projection image.

According to an exemplary embodiment, the light source may include a plurality of solid-state light-emitting elements; the light-intensity measuring section may include a plurality of light-intensity measuring elements corresponding to the plurality of solid-state light-emitting elements; and the light-source controller may control each of the plurality of solid-state light-emitting elements. Since the light-receiving elements functioning as a light-intensity measuring section are arranged in the image forming position of the solid-state light-emitting elements or in the vicinity thereof, the light intensity for each of the plurality of solid-state light-emitting elements of the light source can be measured. The light intensity measurement of each solid-state light-emitting element allows the light intensity of the solid-state light-emitting elements to be stabilized and uniformized. Accordingly, a projector that forms a bright, stable, and uniform projection image is provided.

According to an exemplary embodiment of the invention an operation unit to perform a specified calculation based on the signal from the light-intensity measuring section and outputting the calculation to the light-source controller may be included. Accordingly, a projector, which is capable of controlling light intensity in response to its use conditions or user's requirements, is provided.

According to an exemplary embodiment, the operation unit may perform the specified calculation using the number of the movable mirror elements reflecting the light from the light source in a direction other than that of the projector lens. Referring to the direction, in which the movable mirror elements point when the light from the light source is reflected in the direction other than that of the projector lens, as "an OFF-direction," the light intensity measured by the light-intensity measuring section varies depending on the number of the movable mirror elements in the OFF-direction in addition to the light intensity of all the light from the light source. The calculation using the number of the movable mirror elements in the OFF-direction allows the output of the light source to be calculated. Since the output of the light source can be accurately controlled irrespective of the number of the movable mirror elements in the OFF-direction as above-described, the light intensity of the light source can be always stabilized and uniformized even during image projection while the movable mirror elements are being driven. Accordingly, a projector that constantly forms a bright, stable, and uniform projection image can be provided.

According to an exemplary embodiment, the light source may include a first light source to emit light in a first wavelength range and a second light source to emit light in a second wavelength range different from the first wavelength range; the first light source and the second light source arranged in approximately symmetrical positions with respect to the projector lens; and the light-intensity measuring section including a first light-intensity measuring section and a second light-intensity measuring section. The first light-intensity measuring section is arranged in the vicinity of the second light source and out of the light from the first light source, measures the light intensity of the light reflected in the direction other than that of the projector lens. The second light-intensity measuring section is arranged in the vicinity of the first light source and out of the light from the second light source, measures the light intensity of the light reflected in the direction other than that of the projector lens.

Since the light-receiving elements that measure the light from the first light source are disposed in the position in which the image of the first light source is substantially imaged and the light-receiving elements that measure the light from the second light source are disposed in the position in which the image of the second light source is substantially imaged, the light-receiving elements can be arranged in correspondence with the arrangement of the light sources. Since the light-receiving elements that measure the light from the first light source are disposed in the vicinity of the second light source, while the light-receiving elements that measure the light from the second light source are disposed in the vicinity of the first light source, the intensity of the light of the light source can be stabilized and uniformized with a simple structure. Accordingly, a projector is provided which forms a bright, stable, and uniform projection image with a simple structure.

The first light-intensity measuring section and the second light source may be formed on an identical substrate, the first light-intensity measuring section being arranged among the plurality of solid-state light-emitting elements of the second light source; and the second light-intensity measuring section and the first light source are formed on an identical substrate, the second light-intensity measuring section being arranged among the plurality of solid-state light-emitting elements of the first light source. In the tilt mirror device that is a spatial light modulator, the movable mirror elements selectively shift the position of their reflecting surfaces (reflecting angles). Since the movable range of the movable mirror elements is limited, the light deflection angle of the spatial light modulator is also limited. The mixed arrangement of the light-receiving elements among the solid-state light-emitting elements on the light-source substrate maximizes the utilization of the light deflection angle of the spatial light modulator. This ensures the clearance between the light source and the barrel of the projector lens, reducing or preventing spatial interference therebetween.

The first light-intensity measuring section and the second light source may be formed on an identical substrate, the first light-intensity measuring section being arranged in a region different from the second light source; and the second light-intensity measuring section and the first light source are formed on an identical substrate, the second light-intensity measuring section being arranged in a region different from the first light source. Since the light-receiving elements are arranged in the region different from the solid-state light-emitting elements on the identical substrate, the light-receiving elements are thermally and electrically isolated from the solid-state light-emitting elements. Thus, the light-receiving elements are less influenced by heat propagation and electrical noise from the solid-state light-emitting elements, thus making a measurement with less error. Accordingly, a projector having a stable brightness and more accurate uniformity can be provided.

A projector according to an aspect of the invention includes a light source to emit light; a spatial light modulator to modulate the light from the light source in accordance with an image signal; a projector lens to project the light modulated by the spatial light modulator; and a light-source controller. The spatial light modulator is a tilt mirror device including a movable mirror element reflecting the light from the light source in the direction of the projector lens or in the direction other than that of the projector lens. The light source includes a first light source to emit light in a first wavelength range and a second light source to emit light in a second wavelength range different from the first wavelength range. The first light source and the second light source are arranged in approximately symmetrical positions with respect to the projector lens. The first light source receives the light from the second light source to measure the light intensity of the second light source. The second light source receives the light from the first light source to measure the light intensity of the first light source. The light-source controller controls the light source on the basis of the measured light intensity.

Since the solid-state light-emitting elements of the light source function as a time-division light-intensity measuring section when they are emitting no light, there is no need to provide a separate light-receiving element. Since the light-receiving element itself is not necessary, the light intensity of the light source can be stabilized and uniformized with an inexpensive and simple structure without increasing the number of parts. Accordingly, a projector is provided which forms a bright, stable, and uniform projection image with a simple structure.

An aspect of the invention provides an optical device including a light source to emit light; a spatial light modulator to modulate the light from the light source in accordance with an image signal; and an imaging lens to image the light modulated by the spatial light modulator onto a specified surface. The spatial light modulator is a tilt mirror device including a movable mirror element reflecting the light from the light source in the direction of the imaging lens or in the direction other than that of the imaging lens. The optical device further includes: a light-intensity measuring section provided in an imaging position of the light source or in the vicinity of the imaging position to measure the light intensity of the light reflected in the direction other than that of the projector lens; and a light-source controller to control the light source in accordance with the signal from the light-intensity measuring section. Accordingly, an effective and stable optical device is provided in which the light intensity of the light source can be stabilized without decreasing efficiency.

DETAILED DESCRIPTION OF EXEMPLARY EMBODIMENTS

The present invention will be specifically described hereinafter with reference to the drawings.

First Exemplary Embodiment

Figure 1:
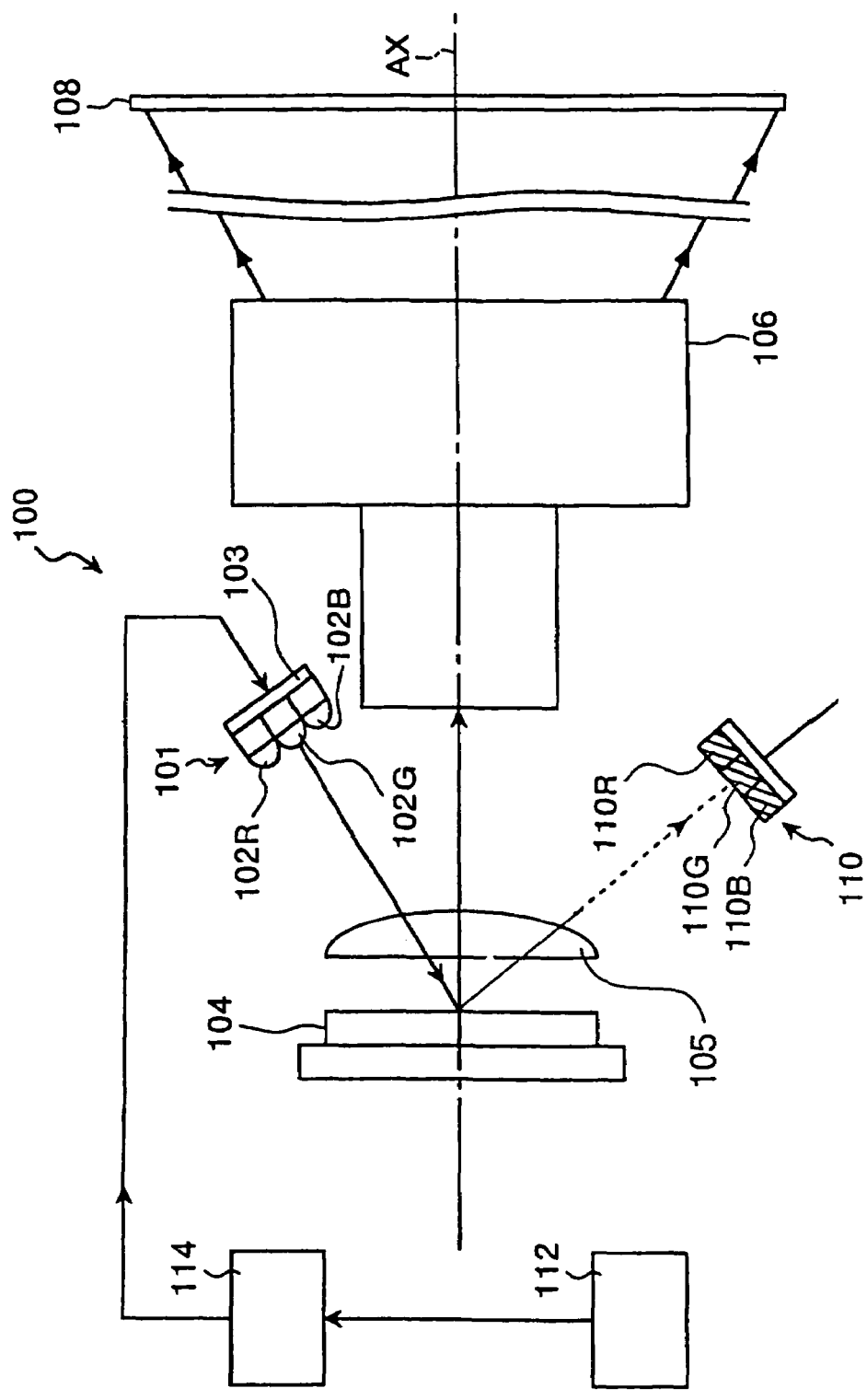
FIG. 1 is a schematic of a projector according to a first exemplary embodiment of the present invention.

FIG. 1 shows a schematic of a projector 100 according to a first exemplary embodiment of the present invention. A light source 101 of the projector 100 includes a plurality of light-emitting diodes (hereinafter, "LED") which are solid-state light-emitting elements. The LEDs of the light source 101 are driven by a light-source drive circuit 103. The LEDs include an R-light LED 102R that emits red light (hereinafter, s "R-light"), a G-light LED 102G that emits green light (hereinafter, "G-light"), and a B-light LED 102B that emits blue light (hereinafter, "B-light").

The light emitted from the light source 101 passes through a field lens 105 and is then incident on a spatial light modulator 104. The field lens 105 has the function of illuminating the spatial light modulator 104 in a telecentric manner. Specifically, the function of letting the illumination light into the spatial light modulator 104 as parallel as possible to a principal ray. The projector 100 forms the image of the light source 101 in the position of the entrance pupil of a projector lens 106 to make Koehler illumination on the spatial light modulator 104. The spatial light modulator 104 is a tilt mirror device, which modulates the incident light in accordance with an image signal. One example of the tilt mirror device is a DMD of Texas Instrument Inc. The light modulated by the spatial light modulator 104 exits toward the projector lens 106. The projector lens 106 projects the light emerging from the spatial light modulator 104 onto a screen 108.

The spatial light modulator 104 includes a plurality of movable mirror elements (not shown). The movable mirror elements move selectively between a first reflecting position and a second reflecting position in accordance with the image signal to reflect the incident light toward the projector lens 106 (ON) or in the direction other than that of the projector lens 106 (OFF). The light advancing toward the projector lens 106 forms a projection image on the screen 108.

The light source 101 lights on the R-light, G-light, and B-light LEDs in sequence in one frame of the projection image to illuminate the spatial light modulator 104. An observer integrates the R-light, G-light, and B-light, which are emitted from the light source 101 in sequence and modulated by the spatial light modulator 104, to recognize them. Accordingly, a full-color projection image is formed on the screen 108. To obtain an entirely white projection image by the sequential projection of the R-light, G-light, and B-light, the amount of G-light flux must be 60 to 80 percent of all the light flux. Assuming that the output amount and the number of the color-light LEDs are equal, the amount of G-light flux would become insufficient. Therefore, when the R-light, G-light, and B-light LEDs are arranged in equal numbers, the lighting time of the G-light LED is made longer than those of the R-light and B-light LEDs. When the G-light LEDs are arranged more than the R-light and B-light LEDs, the lighting time of the G-light LED can be made equal to or shorter than those of the other color LEDs. This allows natural full color images to be provided.

The light, reflected from the spatial light modulator 104 to advance in the direction other than that of the projector lens 106, is incident on a light-intensity measuring section 110. The light-intensity measuring section 110 is arranged in the position on which the OFF-light from the spatial light modulator 104 is incident. More specifically, according to the exemplary embodiment, the light-intensity measuring section 110 is arranged in the positions in which the LEDs 102R, 102G, and 102B form images or in the vicinity thereof when all the movable mirror elements are located in the positions corresponding to the OFF (light off) of the pixels. The position of the light-intensity measuring section 110 and the positions of the LEDs 102R, 102G, and 102B are conjugate with each other when all the movable mirror elements are located in the positions corresponding to the OFF (light off) of the pixels. The light-intensity measuring section 110 includes light-receiving elements 110R, 110G, and 110B, which are light-intensity measuring elements corresponding to the LEDs 102R, 102G, and 102B. The light-receiving elements may be photodiodes, for example. The light-receiving elements 110R, 110G, and 110B measure the light from the LEDs 102R, 102G, and 102B in the substantially imaging positions, respectively. The light-receiving elements 110R, 110G, and 110B then output the signals corresponding to the respective light quantities of the LEDs to an operation unit 112. The operation unit 112 processes the signals outputted from the light-receiving elements 110R, 110G, and 110B by a specified method and outputs the calculations to a light-source controller 114. The light-source controller 114 controls the light-source drive circuit 103 in accordance with the calculation outputted from the operation unit 112 to control the output of the light source 101. For example, the initial values of the light intensity of the LEDs are stored in a memory (not shown) and a feedback control is performed using the initial value as target values, so that the luminance of the light from the light source 101 can be maintained stably in the initial values. Thus, the light intensity of the LEDs 102R, 102G, and 102B can be maintained uniform.

The structure, in which the light intensity, or the outputs of the LEDs 102R, 102G, and 102B is measured, allows the projector 100 to respond to the physical change of the LEDs 102R, 102G, and 102B over time due to heat generation, lifetime and so on, and to control the light intensity. Since the light from the light source 101 is not directly measured but the light from the spatial light modulator 104 is measured, there is no need to arrange the light-intensity measuring section 110 in the vicinity of the light source 101. Since the light-intensity measuring section 110 is not arranged in the vicinity of the light source 101, the path of the light that forms a projection image is not blocked off by the light-intensity measuring section 110. Since the waste light, which is not used for image formation, is used to measure the light intensity, as described above, the light intensity of the light source 101 can be controlled without losing the brightness to form a projection image even during image projection. This allows the light intensity of the light source 101 to be stabilized without losing the brightness of the projection image, thus providing the projector 100 capable of projecting bright and stable images.

Figure 2:
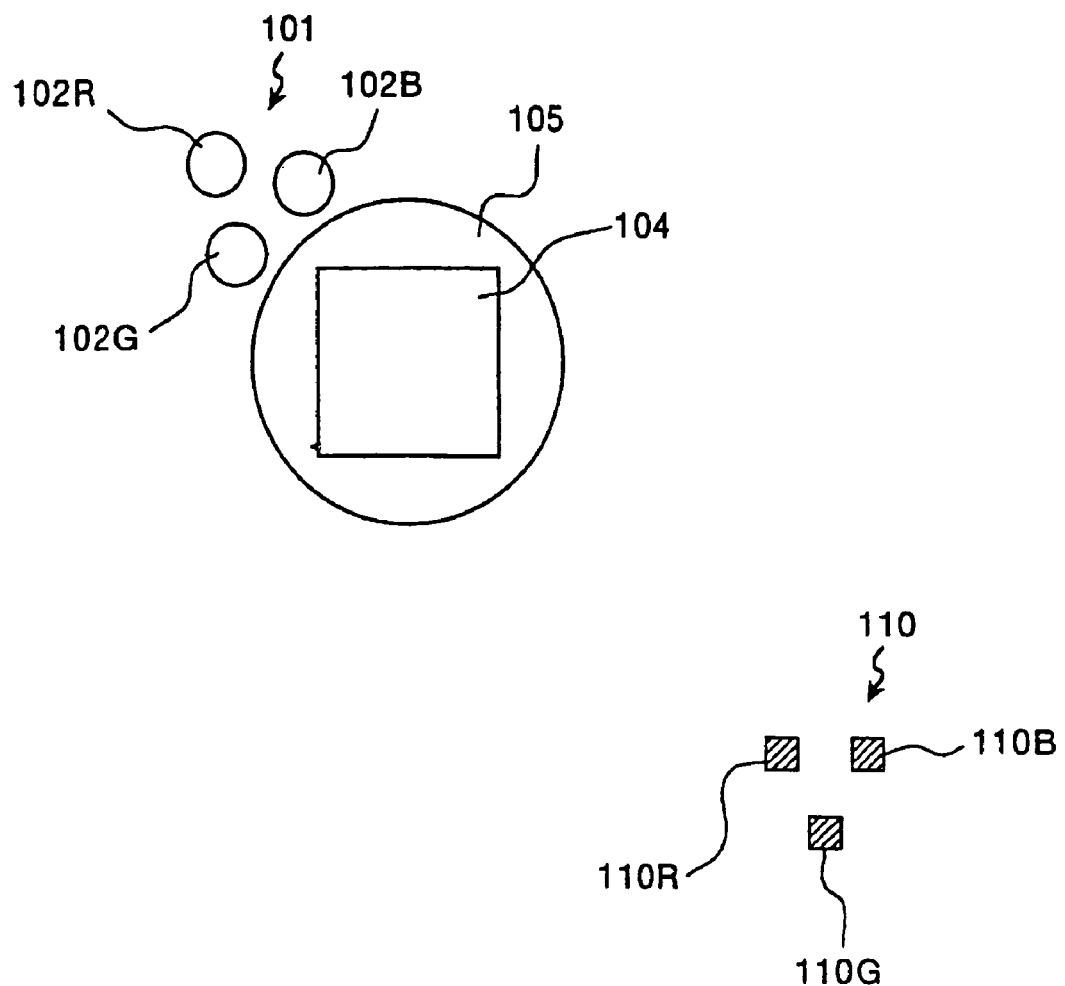
FIG. 2 is a schematic of the arrangement of solid-state light-emitting elements and light-receiving elements.

FIG. 2 shows a view seeing from the spatial light modulator 104 toward the projector lens 106. Referring to FIG. 2, the arrangement of the LEDs 102R, 102G, and 102B of the light source 101 and the light-receiving elements 110R, 110G, and 110B will be described. When all the movable mirror elements are located in the positions corresponding to the OFF (light-off) of pixels, the light-receiving elements 110R, 110G, and 110B are arranged in the position in which the LEDs 102R, 102G, and 102B form images or in the vicinity thereof. As described above, when all the movable mirror elements are located in the positions corresponding to the OFF (light-off) of pixels, the R-light LED 102R and the light-receiving element 110R, the G-light LED 102G and the light-receiving element 110G, and the B-light LED 102B and the light-receiving element 110B are conjugate with each other, respectively. The light-receiving elements 110R, 110G, and 110B detect the light from the LEDs 102R, 102G, and 102B in conjugation therewith. Thus, the light from each of the LEDs 102R, 102G, and 102B can be detected. The light-source controller 114 controls the light-source drive circuit 103 in accordance with the signal outputted from the light-intensity measuring section 110. The light-source drive circuit 103 controls the respective drive currents of the LEDs 102R, 102G, and 102B, thereby controlling the outputs of the LEDs 102R, 102G, and 102B.

The light intensity of each LED can be measured by arranging the light-receiving elements 110R, 110G, and 110B in the image forming positions of the LEDs 102R, 102G, and 102B or in the vicinity thereof. The measurement of the light intensity of each of the LEDs 102R, 102G, and 102B allows the light intensity of LEDs to be stabilized and uniformized. Batch control of the plurality of LEDs makes it difficult to uniformize the light intensity of the LEDs. Also, the batch control of the plurality of LEDs also controls LEDs that require no light intensity control, thereby applying an unnecessary load on the LEDs that require no light intensity control. The application of the unnecessary load would make the outputs of the LEDs unstable, thereby preventing the stabilization of the light intensity of each LED and promoting the degradation of the LEDs. According to the exemplary embodiment, the light intensity of each LED is controlled individually, allowing control according to the condition of each LED, and thus providing the projector 100 capable of projecting bright, stable, and uniform images without applying an unnecessary load on the LEDs.

Figure 3:
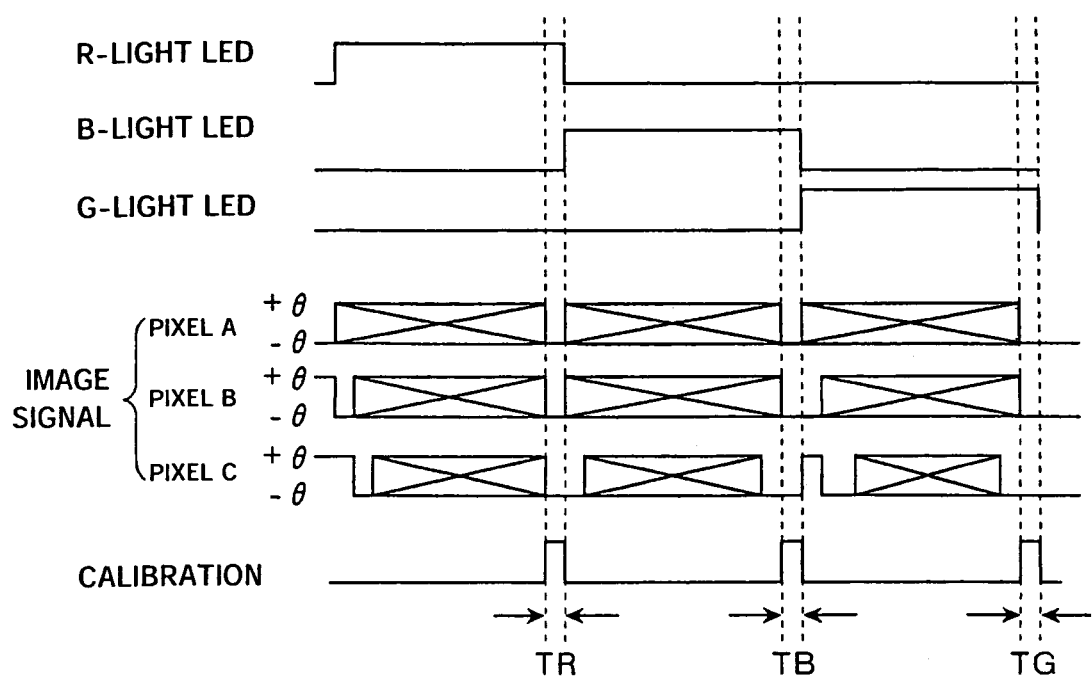
FIG. 3 is a schematic of an example of light intensity measurement timing.
Figure 4:
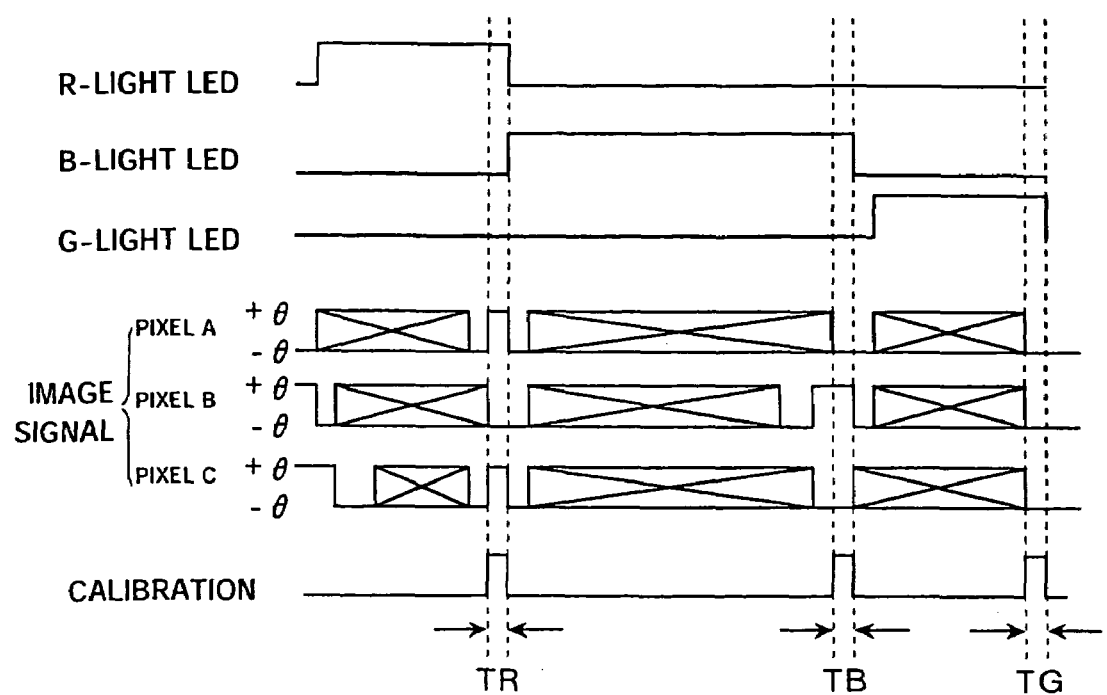
FIG. 4 is a schematic of an example of light intensity measurement timing.

Referring now to FIGS. 3 and 4, the operation and the timing of measuring the light intensity will be described. The timing charts of FIGS. 3 and 4 are for one frame of an projection image, showing the driving time (light-on time) of the LEDs 102R, 102G, and 102B, the image signals of the pixels, and the detection timings of the light-receiving elements 110R, 110G, and 110B, from the top. The charts of FIGS. 3 and 4 are represented in a positive logic. The pixel is the minimum unit of a projection image, which corresponds to the movable mirror element of the spatial light modulator 104. FIGS. 3 and 4 illustrate three pixels A, B, and C. An image transmitter (not shown), such as a computer outputs image signals for all the pixels in the projection image to the spatial light modulator 104. The spatial light modulator 104 drives the movable mirror elements in accordance with the image signals to modulate the light. The image signals for the pixels at the timing other than the detection timings of the light-receiving elements 110R, 110G, and 110B correspond to the projected image and are arbitrary.

The movable mirror elements are driven in the direction of $+\theta$ or $-\theta$ depending on the image signals. Suppose that the light emitted from the light source 101 into the spatial light modulator 104 is reflected toward the projector lens 106 when the movable mirror element is in the direction of $+\theta$, while when the movable mirror element is in the direction of $-\theta$, it is reflected in the direction other than that of the projector lens 106. For the purpose of explanation, the orientation of the movable mirror element that reflects the light from the light source 101 in the direction other than that of the projector lens 106, that is $-\theta$ direction, is hereinafter referred to as "OFF-direction."

FIG. 3 shows the state in which timings TR, TB, and TG, at which all the movable mirror elements of the spatial light modulator 104 are pointed in the OFF-direction, are proactively provided to allow the light-intensity measuring section 110 to measure the light intensity. When all the movable mirror elements of the spatial light modulator 104 are in the OFF-direction, all the light from the light source 101 is applied to the light-intensity measuring section 110, so that the light-intensity measuring section 110 can measure the light intensity of the light source 101. The light-intensity measuring timing by the light-intensity measuring section 110 is hereinafter referred to as "a calibration mode."

Providing calibration modes TR, TB, and TG in each color-light frame (subframe), at least one time, allows the measurement of the light intensity of the LEDs 102R, 102G, and 102B of the light source 101. When the light source 101 includes a plurality of LEDs for each color light, the light intensity for the individual LED can be measured by providing the calibration mode during the lighting of only the single LED for each color. Thus, the light intensity can be controlled for each color light or each LED.

The calibration mode can be set freely. The setting may be made at any time during the image projection, for any frame, at the time the projector 100 is turned on, at the time the drive current of the light source 101 fluctuates, at the time the ambient temperature of the light source 101 fluctuates and so on. In the example of FIG. 3, the calibration mode is provided in each color-light frame in one frame of the projection image. However, it may be varied as appropriate. For example, one frame in the projection image may be set only in the R-light frame and the next frame may be set only in the G-light frame.

In the example of FIG. 3, the timing is proactively provided at which all the movable mirror elements of the spatial light modulator 104 are directed in the OFF-direction, being set as a calibration mode. In the example of FIG. 4, the calibration mode is set irrespective of the number of the OFF-direction movable mirror elements, as shown by the timings TR, TB, and TG. In this case, the operation unit 112 performs a specified calculation using the number of the OFF-direction movable mirror elements in accordance with the image signal sent from the image transmitter (not shown).

The light intensity measured by the light-intensity measuring section 110 varies depending on the number of the OFF-direction movable mirror elements. The calculation using the number of the OFF-direction movable mirror elements allows the calculation of the light intensity when all the movable mirror elements of the spatial light modulator 104 are set in the OFF-direction. For example, suppose that the spatial light modulator 104 includes three movable mirror elements corresponding to the pixels A, B, and C as described above. The three movable mirror elements corresponding to the pixels A, B, and C are irradiated with the light from the light source 101 in a uniform manner and the relationship between the received light intensity and the output is linear at the light-receiving elements 110.

In the calibration mode TR, of the pixels A, B, and C, only the movable mirror element corresponding to the pixel B points in the OFF-direction. The light intensity measured by the light-receiving element 110 corresponds to one third of the light intensity when all the movable mirror elements of the spatial light modulator 104 point in the OFF-direction. The operation unit 112, therefore, multiplies the output of the light-intensity measuring section 110 by three to convert it to a value when all the movable mirror elements point in the OFF-direction. Similarly, the operation unit 112 converts the output of the light-intensity measuring section 110 to 1.5 times in the calibration mode TB and to 1.0 time in the calibration mode TG. The light-source controller 114 controls the light intensity of the light source 101 using the calculation by the operation unit 112.

In the projector 100 according to the exemplary embodiment, the light source 101 includes the plurality of LEDs. Thus, the irradiation of the spatial light modulator 104 is roughly shared by the LEDs of the light source 101. This may cause difference in light intensity measured by the light-intensity measuring section 110 depending on the position of the movable mirror elements in the OFF-direction during the measurement of the light intensity. The error due to the position of the movable mirror elements in the OFF-direction, out of the movable mirror elements of the spatial light modulator 104, may be corrected by the calculation by the operation unit 112, which allows more accurate stabilization of the light intensity.

The output of the light-intensity measuring section 110 is calculated by the operation unit 112 in accordance with the image signal. Thus, the light intensity of the light source 101 can be controlled to a specified value irrespective of the number or the position of the movable mirror elements in the OFF-direction. Since the light intensity is controlled irrespective of the number or the position of the movable mirror elements in the OFF-direction, as described above, the light intensity of the light source 101 can be stabilized and uniformed even during image projection while the movable mirror elements are being driven, thus providing the projector 100 that projects images having an always bright, stable, and uniform luminance.

The operation unit 112 according to the exemplary embodiment performs a specified operation using the number of movable mirror elements that reflect the light from the light source 101 in the direction other than that of the projector lens 106. The invention, however, is not limited to that. The calculation method by the operation unit 112 can be varied as appropriate depending on the intended use of the projector 100, thus providing a projector that controls the light intensity depending on the use condition or the requirements of the user.

According to the exemplary embodiment, the light source 101 includes a plurality of LEDs. The invention, however, may be applied to a structure in which the light source 101 is constructed of a single light-emitting element. The conjugate arrangement of the light-emitting element and the light-intensity measuring section 110 allows the stabilization of the light intensity of the light source 101 without loss of the brightness of the projection image, thus providing the projector 100 capable of projecting bright and stable images.

Second Exemplary Embodiment

Figure 5:
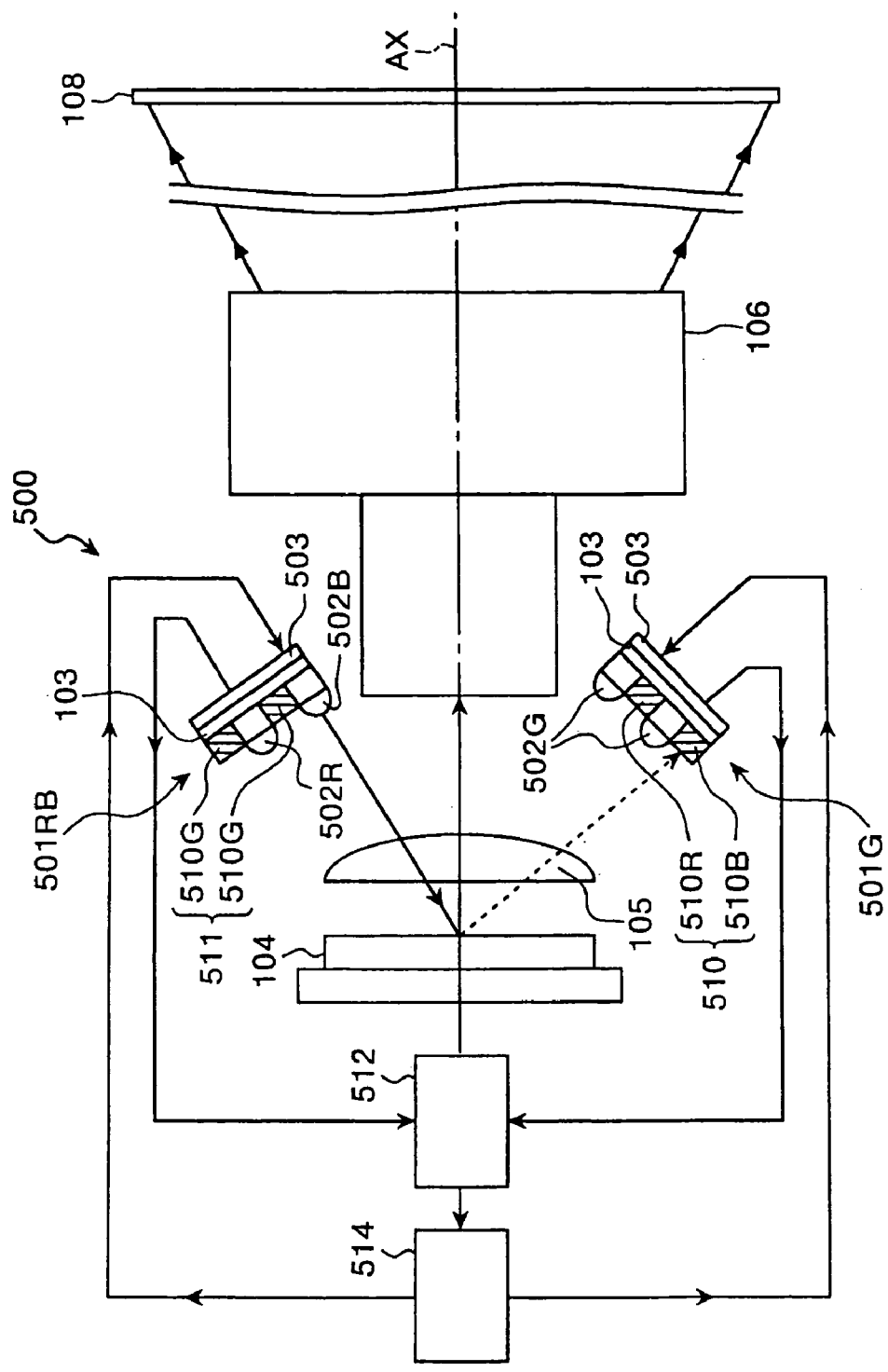
FIG. 5 is a schematic of a projector according to a second exemplary embodiment of the invention.

FIG. 5 shows a schematic of a projector 500 according to a second exemplary embodiment of the invention. The same components as those of the first exemplary embodiment are given the same reference numerals and their redundant description will be omitted. A light source 501 of the projector 500 includes a first light source 501RB that emits light in a first wavelength range and a second light source 501G that emits light in a second wavelength range different from the first wavelength range. The light source 501 denotes both of the first light source 501RB and the second light source 501G hereinafter. The first light source 501RB includes an R-light LED 502R that emits R-light and a B-light LED 502B that emits B-light. The second light source 501G includes G-light LEDs 502G that emit G-light. The first light source 501RB and the second light source 501G are arranged in approximately symmetrical positions with respect to the optical axis AX of the projector lens 106.

Figure 13A:
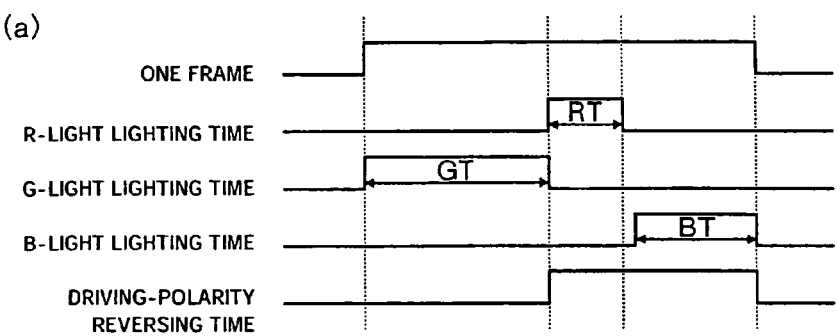
FIG. 13 is a schematic of examples of an LED lighting timing and a half-toning timing.
Figure 13B:
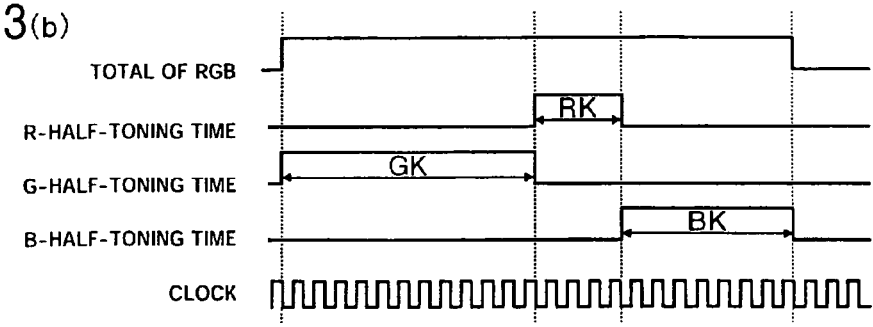

FIG. 13 shows examples of the respective lighting time and half-toning time of the color-light LEDs of the light source 501. The light source 501 illuminates the spatial light modulator 104 in one frame of a projection image by lighting on the R-light LED 502R, the G-light LED 502G, and the B-light LED 502B in sequence. An observer integrates the R-light, the G-light, and the B-light, emitted from the light source 501 in sequence and modulated by the spatial light modulator 104, to recognize them. A full-color projection image is thus formed on the screen 108.

To obtain an entirely white projection image by the sequential projection of the R-light, G-light, and B-light, the amount of G-light flux must be 60 to 80 percent of all the light flux. Assuming that the output amount and the number of the color-light LEDs are equal, the amount of G-light flux would become insufficient. Therefore, as shown in FIG. 13(*a*), the lighting time GT of the G-light LED 502G is made longer than any of the lighting time RT of the R-light LED 502R and the lighting time BT of the B-light LED 502B. FIG. 13(*b*) shows the color toning of the projection image by controlling half-toning time. The half-toning time is the time period that the spatial light modulator 114 needs to achieve intensity (tone) corresponding to the image signal for each color light. The respective half-toning times agree with the periods of the subframes of the images corresponding to the respective color lights. When the tone of the image is represented by n-bit (n is a positive integer), the length of the unit bit of the G-light half-toning time GK and the respective lengths of the unit bit of the R-light and B-light half-toning times RK and BK can be made different. When the number of the G-light LEDs 502G is larger than any of the numbers of the R-light LEDs 502R and the B-light LEDs 502B, the lighting time GT of the G-light LEDs 502G can be made equal to or shorter than the lighting time RT of the R-light LED 502R and the lighting time BT of the B-light LED 502B.

The R-light LED 502R and the B-light LED 502B and the G-light LED 502G are arranged symmetrically with respect to the optical axis AX of the projector lens 106, as described above. With such a structure, the versatility of arrangement is increased such that the G-light LEDs 502G are arranged more than the R-light LED 502R and the B-light LED 502B. Thus, a projection image with color balance can be provided with a simple structure.

The movable mirror elements are driven in the +θ direction or the −θ direction in accordance with the image signals. In this way, the movable mirror elements of the spatial light modulator 104 shift selectively between a first reflecting position and a second reflecting position, in accordance with the image signals to reflect the incident light toward the projector lens 106 (ON), or in the direction other than that of the projector lens 106 (OFF). The light emitted from the first light source 501RB and incident on the spatial light modulator 104, is reflected toward the projector lens 106 when the movable mirror element of the spatial light modulator 104 points in the +θ direction, whereas it is reflected in the direction other than that of the projector lens 106 when the movable mirror element points in the −θ direction. In the frame in which the R-light and the B-light are projected by the driving of the first light source 501RB, the movable mirror elements in the +θ direction reflect the light toward the projector lens 106. In the frame in which the G-light is projected by the driving of the second light source 501G, the movable mirror elements in the −θ direction reflect the light toward the projector lens 106. The driving polarity of the movable mirror elements is reversed among the lighting time GT of the G-light LED 502G, the lighting time RT of the R-light LED 502R, and the lighting time BT of the B-light LED 502B. The spatial light modulator 104 thus modulates the light depending on the ON and OFF of the image signals, providing a full-color projection image.

In the projector 500 according to the exemplary embodiment, a second light-intensity measuring section 511 and the first light source 501RB are formed on an identical substrate 503. Light-receiving elements 510G constructing the second light-intensity measuring section 511 are arranged between the LEDs 502R and 502B, that are solid-state light-emitting elements of the first light source 501RB, as will be described later. The substrate 503 also includes the light-source drive circuit 103 formed thereon. The light-receiving elements 510G are arranged in the image forming position of the second light source 501G or in the vicinity thereof.

Similarly, a first light-intensity measuring section 510 and the second light source 501G are formed on the identical substrate 503. Light-receiving elements 510R and 510B, constructing the first light-intensity measuring section 510, are arranged between the LEDs 502G that are solid-state light-emitting elements of the second light source 501G, as will be described later. The substrate 503 also includes the light-source drive circuit 103 formed thereon. The light-receiving elements 510R and 510B are arranged in the image forming position of the first light source 501RB or in the vicinity thereof.

Figure 6:
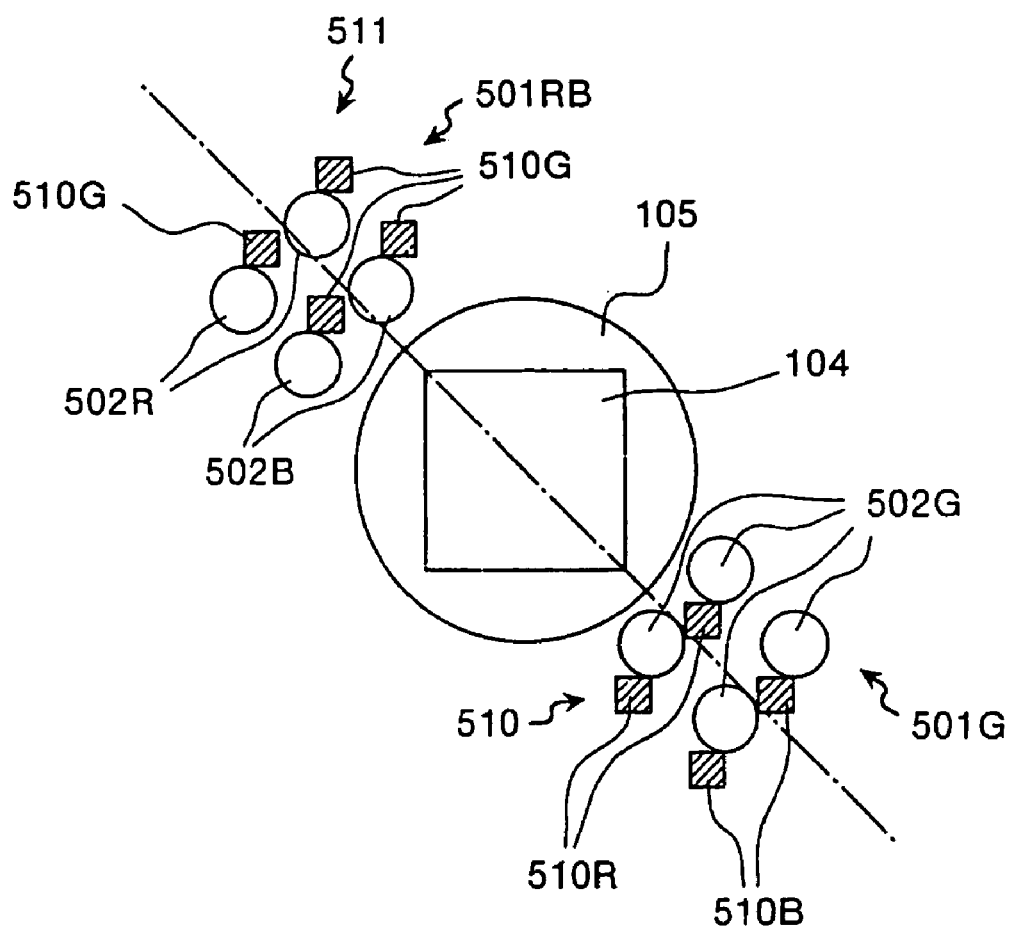
FIG. 6 is a schematic of the arrangement of solid-state light-emitting elements and light-receiving elements.

FIG. 6 shows a view as seen from the spatial light modulator 104 toward the projector lens 106. Referring to FIG. 6, the arrangement of the color-light LEDs 502R, 502G, and 502B and the light-receiving elements 510R, 510G, and 510B will be described. In the exemplary embodiment, when all the movable mirror elements are inclined at approximately 0°, the R-light LED 502R and the B-light LED 502B of the first light source 501RB and the light-receiving elements 510R and 510B are conjugate with each other, respectively. Similarly, when all the movable mirror elements are inclined at approximately 0°, the G-light LEDs 502G of the second light source 501G and the light-receiving elements 510G are conjugate with each other.

The light emitted from the first light source 501RB will first be described. The light from the first light source 501RB is modulated by the spatial light modulator 104 and advances in the direction of the projector lens 106 or in the direction other than that of the projector lens 106. The light (OFF-light) advancing in the direction other than that of the projector lens 106 is reflected in the direction that forms an angle of +4θ with respect to the axis (for example, the optical axis of the projector lens 106) coupling the spatial light modulator 104 and the projector lens 106. When the inclination of the movable mirror element is approximately 0°, the light emitted from the first light source 501RB is incident on the light-receiving elements 510R and 510B which are arranged on the identical substrate 503 with the second light source 501G and which construct the first light-intensity measuring section 510. The light-receiving elements 510R and 510B output signals corresponding to the respective light quantities of the LEDs 502R and 502B to an operation unit 512. The operation unit 512 makes a calculation based on the outputs from the light-receiving elements 510R and 510B. The operation unit 512 outputs the calculation to a light-source controller 514. The light-source controller 514 controls the light-source drive circuit 103 in accordance with the output from the operation unit 512 to control the outputs of the first light source 501RB for each of the LEDs 502R and 502B.

The light emitted from the second light source 501G will be described next. The light from the second light source 501G is modulated by the spatial light modulator 104 and advances in the direction of the projector lens 106 or in the direction other than that of the projector lens 106. The light (OFF-light) advancing in the direction other than that of the projector lens 106 is reflected in the direction that forms an angle of −4θ with respect to the axis (for example, the optical axis of the projector lens 106) coupling the spatial light modulator 104 and the projector lens 106. When the inclination of the movable mirror element is approximately 0°, the light emitted from the second light source 501G is incident on the light-receiving elements 510G which are arranged on the identical substrate 503 with the first light source 501RB and which construct the second light-intensity measuring section 511. The light-receiving elements 510G output signals corresponding to the respective light intensities of the LEDs 502G to the operation unit 512. The operation unit 512 makes a calculation based on the outputs from the light-receiving elements 510G.

The operation unit 512 outputs the calculation to the light-source controller 514. The light-source controller 514 controls the light-source drive circuit 103 in accordance with the output from the operation unit 512 to control the outputs of the second light source 501G for each LED 502G.

In the exemplary embodiment, each of the movable mirror elements is given a reset signal at the timing when the subframes are switched. Given the reset signal, the inclination of the movable mirror element that is inclined at −θ or +θ becomes 0°. Specifically, the normal of the movable mirror element becomes substantially parallel with the optical axis of the projector lens by the reset signal. Thus, the first light-intensity measuring section 510 and the second light-intensity measuring section 511 make light-intensity measurements in synchronization with the timings of the reset signals.

The first light-intensity measuring section 510 to measure the light from the first light source 501RB is arranged in the image forming position of the first light source 501RB or in the vicinity thereof. The second light-intensity measuring section 511 to measure the light from the second light source 501G is arranged in the image forming position of the second light source 501G or in the vicinity thereof. Thus the first light-intensity measuring section 510 and the second light-intensity measuring section 511 can be arranged in correspondence with the arrangement of the first light source 501RB and the second light source 501G. The first light source 501RB and the second light-intensity measuring section 511 are provided on the identical substrate 503. The second light source 501G and the first light-intensity measuring section 510 are arranged on the identical substrate 503. This allows space-saving and the reduction of installation cost. As in the first exemplary embodiment, the optical path to form a projection image is not blocked off by the light-receiving elements 510R, 510G, and 510B. Consequently, the projector 500 can be provided with a simple structure in which the projecting image is bright, stable, and uniform.

In the exemplary embodiment, for example, the light-receiving elements 510G are arranged between the LEDs 502R and 502B on the identical substrate 503. The tilt mirror devices generally modulate the light from the light source 501 by selectively moving the reflection surfaces of the movable mirror elements. The movable ranges of the movable mirror elements are limited. Therefore, the deflection angle at which the spatial light modulator 104 reflects the incident light in the direction of the projector lens 106 or in the direction other than that of the projector lens 106 (in the direction of the corresponding light-receiving element) is also substantially limited. As in the exemplary embodiment, however, the mixed arrangement of, for example, the LEDs 502B and 502R and the light-receiving elements 510G maximizes the utilization of the deflection angle of the spatial light modulator 104. The maximum use of the deflection angle at the spatial light modulator 104 ensures the clearance between the light source 501 and the barrel of the projector lens 106, reducing or preventing spatial interference therebetween.

Third Exemplary Embodiment

Figure 7:
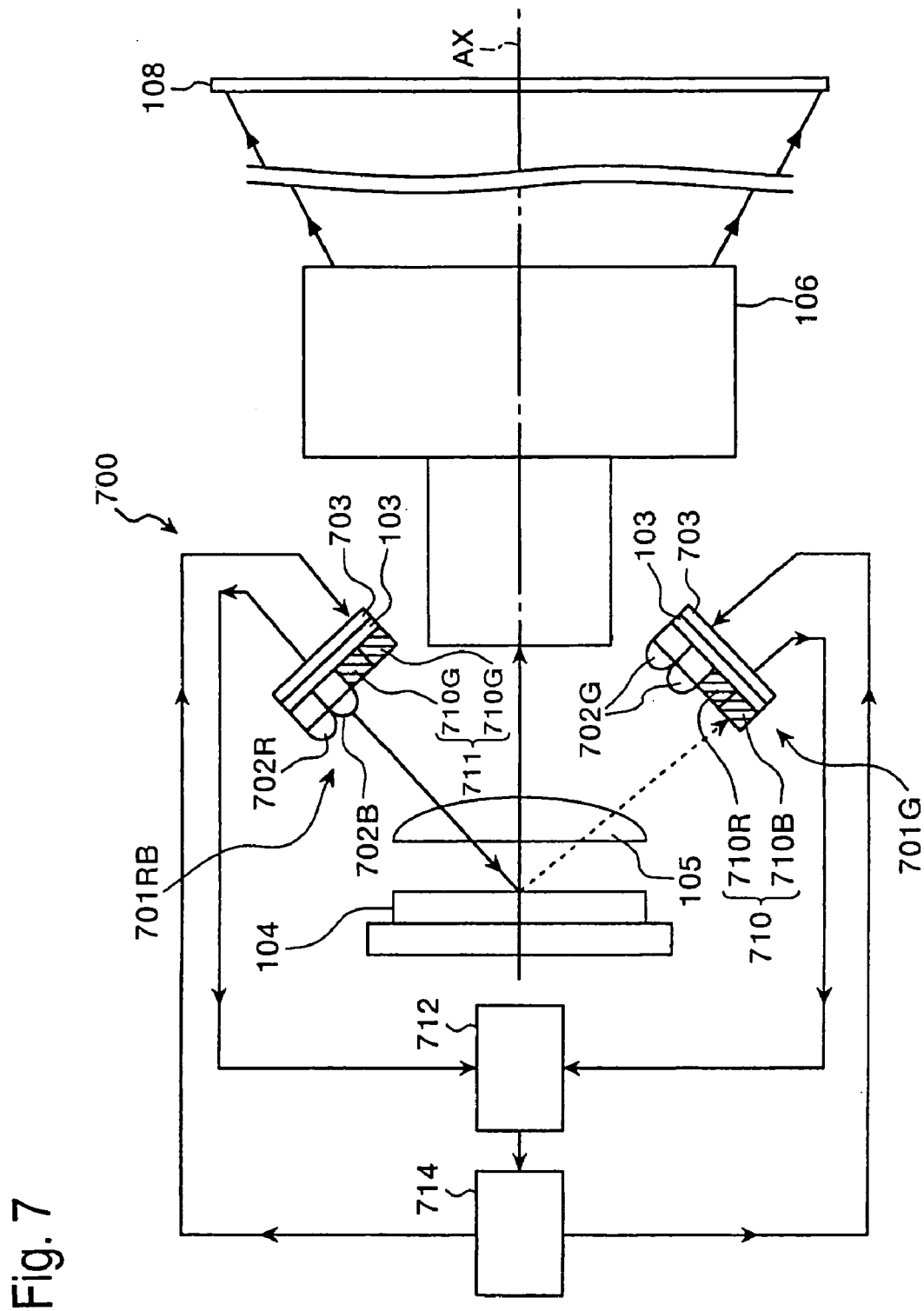
FIG. 7 is a schematic of a projector according to a third exemplary embodiment of the invention.

FIG. 7 is a schematic of a projector 700 according to a third exemplary embodiment of the invention. The same components as those of the first exemplary embodiment are given the same reference numerals and their redundant description will be omitted. The light source of the projector 700 according to the exemplary embodiment includes a first light source 701RB that emits light in a first wavelength range and a second light source 701G that emits light in a second wavelength range different from the first wavelength range as in the second exemplary embodiment. The first light source 701RB includes an LED 702R that emits R-light and an LED 702B that emits B-light. The second light source 701G includes LEDs 702G that emit G-light. The first light source 701RB and the second light source 701G are arranged in approximately symmetrical positions with respect to the optical axis AX of the projector lens 106.

The first light source 701RB and a second light-intensity measuring section 711 are formed on an identical substrate 703. The second light-intensity measuring section 711 is constructed of light-receiving elements 710G. The second light source 701G and a first light-intensity measuring section 710 are formed on the identical substrate 703. The first light-intensity measuring section 710 is constructed of light-receiving elements 710R and 710B. The substrate 703 also includes the light-source drive circuit 103 thereon.

Figure 8:
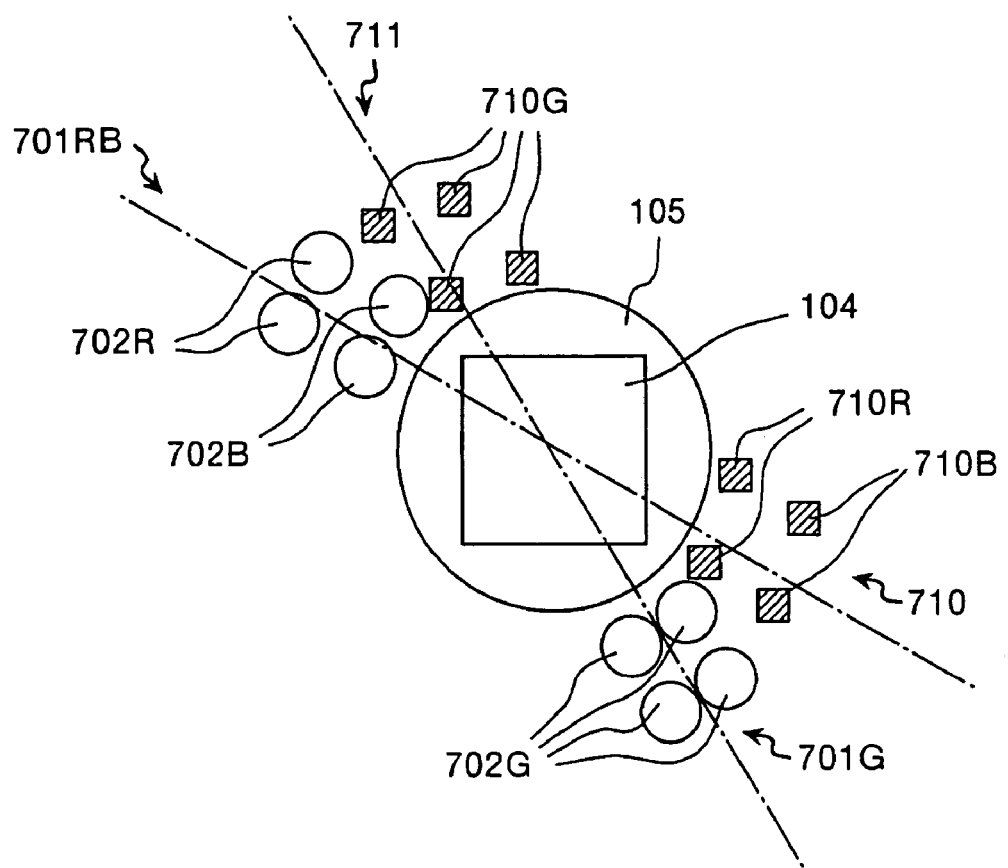
FIG. 8 is a schematic of the arrangement of solid-state light-emitting elements and light-receiving elements.

FIG. 8 shows a view as seen from the spatial light modulator 104 toward the projector lens 106. Referring to FIG. 8, the arrangement of the LEDs and the light-receiving elements will be described. The first light-intensity measuring section 710 is arranged in a region different from the second light source 701G. The LEDs 702G constructing the second light source 701G and the light-receiving elements 710R and 710B constructing the first light-intensity measuring section 710 are each arranged in a concentrated manner. Similarly, the second light-intensity measuring section 711 is arranged in a position different from the first light source 701RB. The LEDs 702R and 702B constructing the first light source 701RB and the light-receiving elements 710G constructing the second light-intensity measuring section 711 are each arranged in a concentrated manner. The R-light LEDs 702R and the B-light LEDs 702B and the light-receiving elements 710R and 710B are substantially conjugate with each other, as in the second exemplary embodiment. The G-light LEDs 702G and the light-receiving elements 710G are also substantially conjugate with each other, as in the second exemplary embodiment.

In the exemplary embodiment, the first light-intensity measuring section 710 is arranged in a region different from the second light source 701G. The second light-intensity measuring section 711 is arranged in a region different from the first light source 701RB. Thus, the light-receiving elements 710R, 710G, and 710B are thermally and electrically isolated from the LEDs 702R, 702G, and 702B. The light-receiving elements 710R, 710G, and 710B are less influenced by heat propagation and electrical noise from the LEDs 702R, 702G, and 702B, thus making a measurement with less error, and providing the projector 700 having a stable brightness intensity and more accurate uniformity.

The first exemplary embodiment, the second exemplary embodiment, and the third exemplary embodiment include, for example, an equal number of LEDs and light-receiving elements 710R, 710G, and 710B, which have one-to-one correspondence to each other to measure the light intensity (for example, refer to FIG. 8). However, the invention is not limited to that. Taking the projector 700 of the third exemplary embodiment as an example, it is also possible that the number of the light-receiving elements 710R, 710G, and 710B is made smaller than that of the LEDs, in which the light from the LEDs is concentrated to the light-receiving elements 710R, 710G, and 710B, and detected, or, alternatively, the number of the light-receiving elements 710R, 710G, and 710B is made larger than that of the LEDs, in which the light from the LEDs is dispersed to the light-receiving elements 710R, 710G, and 710B, and detected. When the number of the light-receiving elements 710R, 710G, and 710B is smaller or larger than that of the LEDs, the light intensity of the light source 701 can be stabilized and uniformized by changing the calculation method by an operation unit 712 as appropriate.

In the second exemplary embodiment and the third exemplary embodiment, for example, the light-receiving elements 710R, 710G, and 710B are arranged on the substrate 703 of the light source 701. However, the invention is not limited to that. Taking the projector 700 of the third exemplary embodiment as an example, the positions, where the light-receiving elements 710R, 710G, and 710B to be arranged, can be changed as appropriate, as far as they are in the vicinity of the light source 701 and in the position where the image of the light source 701 can be substantially imaged. The light-receiving elements 710R, 710G, and 710B, however, need to be placed in positions where the light from the light source 701, which is near the light-receiving elements 710R, 710G, and 710B, is not blocked off.

Fourth Exemplary Embodiment

Figure 9:
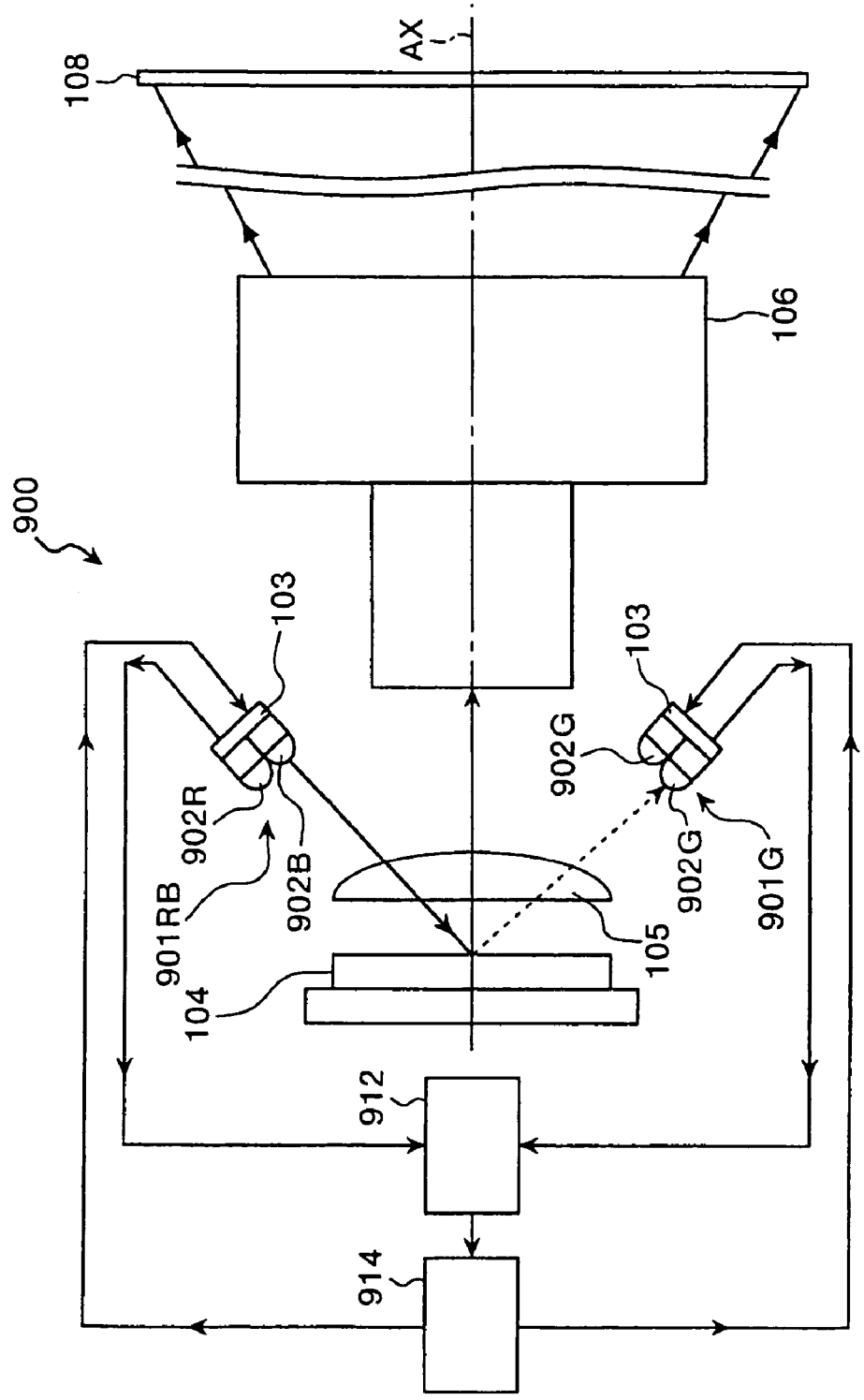
FIG. 9 is a schematic of a projector according to a fourth exemplary embodiment of the invention.

FIG. 9 shows a schematic of a projector 900 according to a fourth exemplary embodiment of the invention. The same components as those of the first exemplary embodiment are given the same reference numerals and their redundant description will be omitted. As in the second exemplary embodiment, the exemplary embodiment includes a first light source 901RB that emits light in a first wavelength range and a second light source 901G that emits light in a second wavelength range different from the first wavelength range. The first light source 901RB includes an LED 902R that emits R-light and an LED 902B that emits B-light. The second light source 901G includes LEDs 902G that emit G-light. The first light source 901RB and the second light source 901G are arranged in approximately symmetrical positions with respect to the optical axis AX of the projector lens 106. In the exemplary embodiment, the first light source 901RB also functions as the second light-intensity measuring section of the second exemplary embodiment and the second light source 901G also functions as the first light-intensity measuring section.

Figure 10:
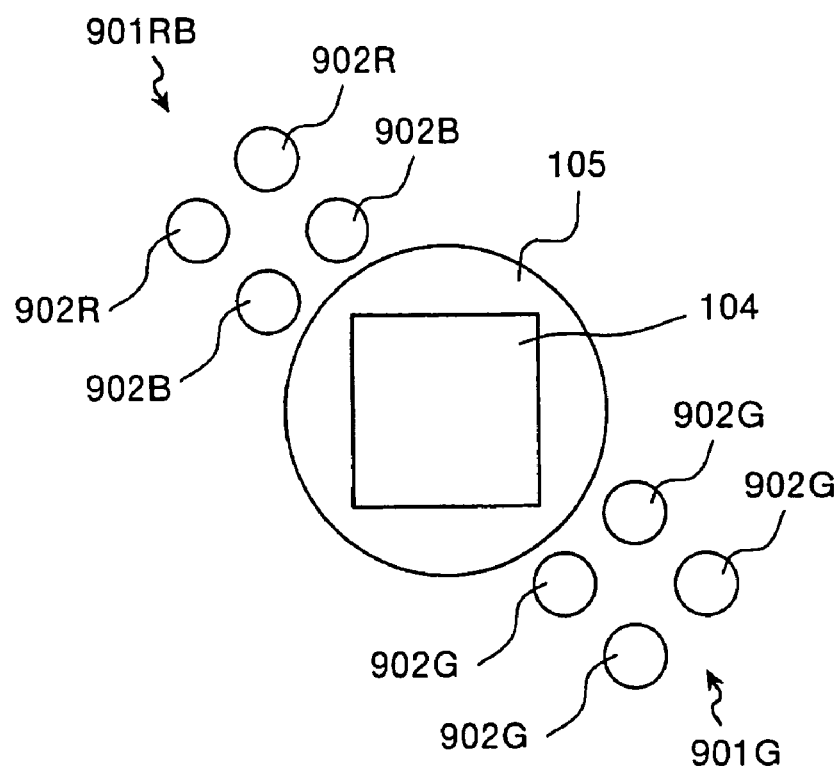
FIG. 10 is a schematic of the arrangement of solid-state light-emitting elements.

FIG. 10 shows a view as seen from the spatial light modulator 104 toward the projector lens 106, and illustrating the arrangement of the light sources 901RB and 901G. When the movable mirror elements are inclined at approximately 0°, the R-light LEDs 902R and the B-light LEDs 902B of the first light source 901RB are arranged in the positions where the second light source 901G forms an image or in the vicinity thereof. When the movable mirror elements are inclined at approximately 0°, the G-light LEDs 902G of the second light source 901G are arranged in the positions where the first light source 901RB forms an image or in the vicinity thereof. Accordingly, when the movable mirror elements are inclined at approximately 0°, the R-light LEDs 902R and the B-light LEDs 902B, and the G-light LEDs 902G are substantially conjugate with each other.

Figure 11:
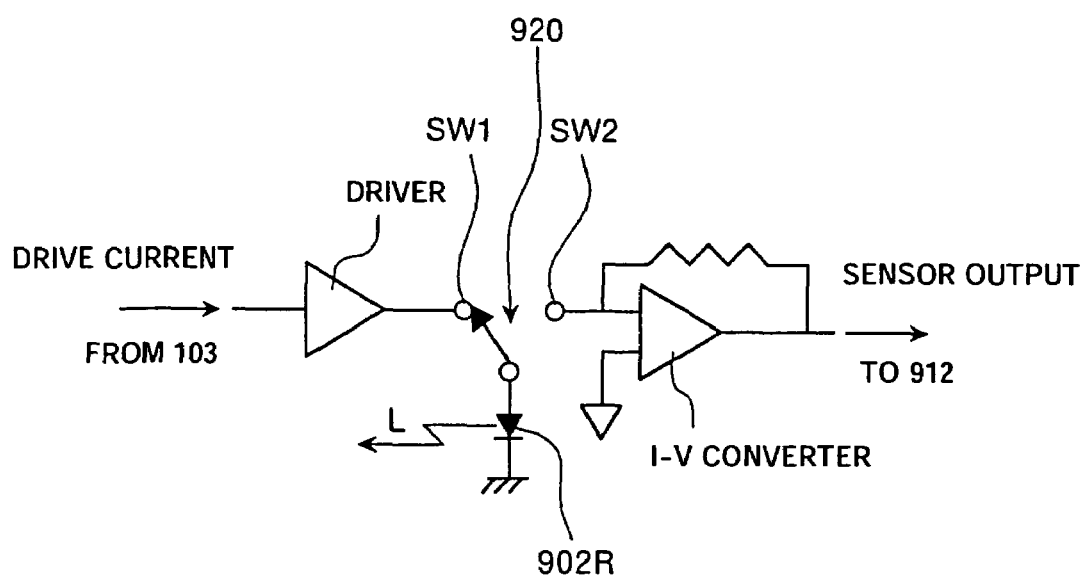
FIG. 11 is a schematic of an example of the circuit of a switch section of an LED.

FIG. 11 shows a circuit schematic to switch the functions of the light-emitting elements and the light-receiving elements of the LEDs 902R, 902G, and 902B. Since every circuit configurations of the LEDs are the same, the LED 902R will be described by way of example. In order that the LED 902R functions as light-emitting element, a terminal SW1 is selected, in which case R-light L is generated from the LED 902R by the drive current from the light-source drive circuit 103.

In order that the LED 902R functions as light-receiving element, a terminal SW2 is selected. The LED 902R outputs a current corresponding to the detected light and sends it to an operation unit 912. Therefore, the LED 902R can be switched between a light-emitting mode and a light-receiving mode in a time division manner by the switching of an analog switch 920. The LED 902R is driven in accordance with an image signal sent from an image transmitter (not shown), and switched to a light-receiving mode at a later-described measuring timing, thereby measuring light intensity.

Since the LED 902R also functions as light-intensity measuring section, there is no need to have a separate light-receiving element. Since the light-receiving element is not needed, the number of components can be reduced, allowing space-saving for the structure to measure light intensity and reduction in installation cost. Thus the versatility of the LEDs 902R, 902G, and 902B of the light source is increased, so that they can be arranged in a small area. Therefore, the first and second light sources 901RB and 901G can be made closer to a point source, which is ideal for the lighting of the projector 900. Consequently, the projector 900 can be provided which is capable of projecting a bright, stable, and uniform projection image with a simple structure.

Figure 12:
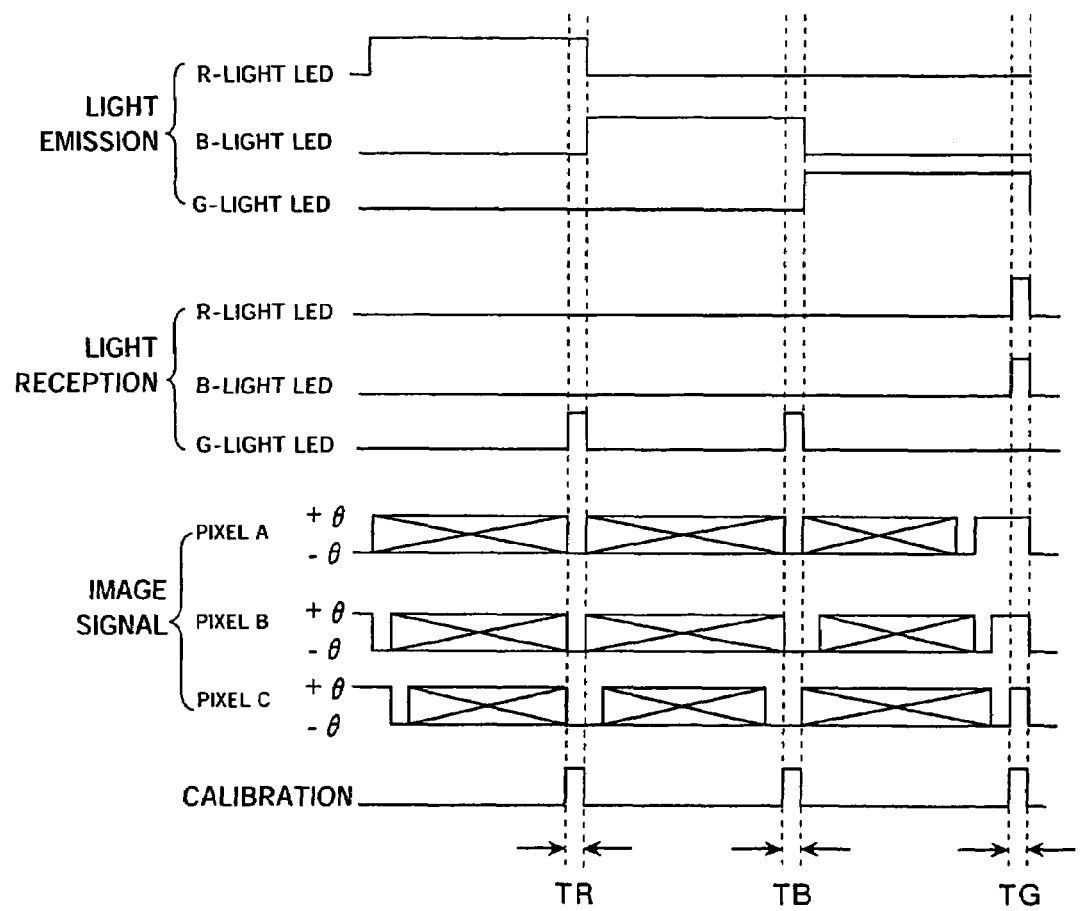
FIG. 12 is a schematic of an example of light-intensity measurement timing.

The operation and the timing to measure light intensity will next be described. FIG. 12 shows an example of the timing of measuring light intensity by the LEDs. The timing chart of FIG. 12 is for one frame of a projection image, showing the respective operating time (lighting time) and the measuring time (light-receiving time) of the color LEDs 902R, 902G, and 902B, the respective image signals of pixels, and the measurement timings by the LEDs, from the top. The chart is represented in a positive logic system.

The spatial light modulator 104 reflects the light from the first light source 901RB toward the projector lens 106 when the movable mirror elements point in the +θ direction, whereas when the movable mirror elements point in the −θ direction, the spatial light modulator 104 reflects the light from the first light source 901RB in the direction other than that of the projector lens 106. The method to control the movable mirror elements is the same as that of the third exemplary embodiment.

As shown in the timing chart of FIG. 12, the timing is proactively provided to make the inclination angles of all the movable mirrors to 0° by sending a reset signal to the frame (subframe) of each color light, at least one time, to set a calibration mode. The light from the R-light LED 902R and the B-light LED 902B is measured by the G-light LED 902G of the second light source 901G in conjugate relation. The light-source drive circuit 103 switches the analog switch 920 of the G-light LED 902G to the terminal SW2 at the respective calibration timings TR and TB in the R-light frame and the B-light frame, in accordance with the image signal.

Similarly, the light from the G-light LED 902G is measured by the R-light LED 902R or the B-light LED 902B in conjugate relation. The analog switch 920 of the R-light LED 902R or the B-light LED 902B is switched to the terminal SW2 at the calibration timing TG in the G-light frame.

The driving polarity of the spatial light modulator 104 is reversed between the period during which the R-light LED 902R and the B-light LED 902B emit light and the period during which the G-light LED 902G emits light, as in the second exemplary embodiment.

While the R-light LED 902R is emitting light, the G-light LED 902G lights off and functions as light-receiving element. At that time, the inclination angles of the movable mirror elements of the spatial light modulator 104 corresponding to pixels A, B, and C are made from $-\theta$ or $+\theta$ to 0° (or horizontal) in the calibration period TR by the reset signal. Thereby the light from the R-light LED 902R is incident on the G-light LED 902G functioning as light-receiving element. Thus the G-light LED 902G measures the light intensity of the R-light.

Similarly, while the B-light LED 902B is emitting light, the G-light LED 902G lights off and functions as light-receiving element. At that time, the inclination angles of the movable mirror elements of the spatial light modulator 104 corresponding to the pixels A, B, and C are made from $-\theta$ or $+\theta$ to 0° (or horizontal) in the calibration period TB by the reset signal. Thereby the light from the B-light LED 902B is incident on the G-light LED 902G functioning as light-receiving element. Thus the G-light LED 902G measures the light intensity of the B-light.

While the G-light LED 902G is emitting light, the B-light LED 902B and the R-light LED 902R light off and function as light-receiving element. At that time, the inclination angles of the movable mirror elements of the spatial light modulator 104 corresponding to the pixels A, B, and C are made from $-\theta$ or $+\theta$ to 0° (or horizontal) in the calibration period TG by the reset signal. Thereby the light from the G-light LED 902G is incident on the B-light LED 902B and the R-light LED 902R functioning as light-receiving element. Thus the B-light LED 902B and the R-light LED 902R measure the light intensity of the G-light.

In the example of FIG. 12, the calibration mode is set one time in each color-light frame in the frame of the projection image; however, various modifications may be made, for example, in which, for one frame in the projection image, the calibration mode is set only in an R-light frame and, for the next frame, the calibration mode is set only in a G-light frame. When a plurality LEDs are provided for each color light, the light intensity of an individual LED for each color light can be measured by providing the calibration mode during only a single LED for each color light is lit on, thereby allowing the light intensity to be controlled for each color light and each LED.

The calibration timing can be set freely as in the first exemplary embodiment. Furthermore, the invention can apply to the structure in which the calibration timing is set by proactively providing the timing at which all the movable mirror elements are pointed in the OFF-direction (refer to FIG. 12), and the structure in which the calibration timing is provided irrespective of the number of the OFF-light mirrors (refer to FIG. 4) and using the calculation by the operation unit 912.

In the above description, the R-light LED 902R and the B-light LED 902B, and the G-light LEDs 902G are substantially conjugate with each other when the inclination angles of all the movable mirror elements are 0°, so that the total sum of the R-light LEDs 902R and the B-light LEDs 902B is equal to the number of the G-light LEDs 902G. The exemplary embodiment, however, is not limited to that; the number of the color-light LEDs can be varied as appropriate depending on the structure, the application and so on of the projector 900, so that the number of the R-light LEDs 902R and the B-light LEDs 902B and the number of the G-light LEDs 902G may be different from each other. For example, when the number of the R-light LEDs 902R and the B-light LEDs 902B is larger than the that of the G-light LEDs 902G, R-light and B-light are collected more to the G-light LED 902G and measured, and G-light is dispersed more to the R-light LED 902R or the B-light LED 902B and measured. In this case, appropriate calculation by the operation unit 912 allows the light intensity of the light sources 901RB and 901G to be stabilized and uniformized, as in the case where the number of the R-light LEDs 902R and the B-light LEDs 902B is equal to that of the G-light LEDs 902G.

When the light source includes a plurality of LEDs for each color light, it is also possible that only some of the LEDs are switched between the light emission and the light reception and other LEDs emit light only. In this case, light is collected to the LED having a light-receiving function and its light intensity is measured. Appropriate calculation by the operation unit 912 allows the light intensity of the first light source 901RB and the second light source 901G to be stabilized and uniformized, as in the exemplary embodiment capable of switching between the light emission and the light reception for all the LEDs.

When the temperature is high owing to the light emission by the LEDs, an error may arise during the light intensity measurement because the temperature is still high when the mode is switched to a light-receiving mode. The error in the light intensity measurement makes it difficult to sufficiently stabilize and uniformize the light intensity of the light source 901. Therefore, a temperature sensor (not shown) may be provided near the LEDs to correct the output of the receiving LEDs on the basis of the temperature of the LEDs and to thereby correct the error due to the change in temperature of the LEDs. The LEDs in the light-receiving mode may function as temperature sensor in the state in which no light is received and no light intensity measurement is made. Therefore, a specific LED of the LEDs in the light-receiving mode can be used only as temperature sensor. Accordingly, it is also possible to detect the temperature with the LED used as temperature sensor and to thereby correct the error due to temperature change.

The exemplary embodiment is constructed such that the R-light, G-light, and B-light LEDs make light emission and light reception. In this case, the received-light detection sensitivity sometimes varies depending on the color combination of the emission-mode LEDs and the reception-mode LEDs. In this case, when the light intensity measurement is performed while the variation in detection sensitivity is corrected, the outputs of the LEDs of the light source 901 can be controlled uniformly. The wavelength range of the light from the emitting LEDs (for example, R-light from the R-light LED 902R) is sometimes low in detection sensitivity for the receiving LEDs (for example, the G-light LED 902G). Even in this case, the light intensity of the light from the light source 901 can be sufficiently measured because the wavelength distribution characteristic of LEDs is relatively wider than that of laser or the like and illuminating LEDs have high outputs.

Fifth Exemplary Embodiment

Figure 14:
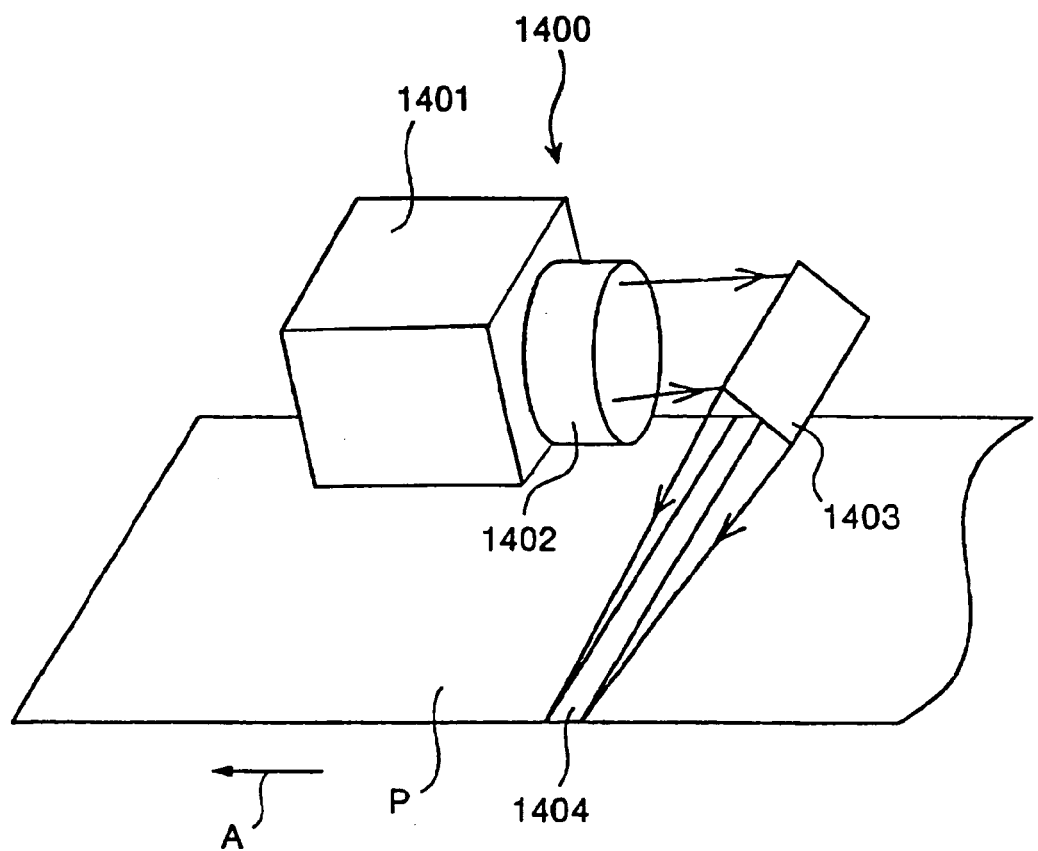
FIG. 14 is a schematic diagram of a printer according to a fifth exemplary embodiment of the invention.

FIG. 14 shows a schematic of a printer 1400 according to a fifth exemplary embodiment of the invention. The same components as those of the first exemplary embodiment are given the same reference numerals and their redundant description will be omitted. The printer 1400 includes an illuminator 1401, an imaging lens 1402, and a reflecting mirror 1403. The illuminator 1401 principally has the same components as those of the projector 100 of the first exemplary embodiment, except the projector lens 106. The light intensity of a light source of the illuminator 1401 is controlled as in the above exemplary embodiments. The light emitted from the illuminator 1401 forms an image on a photographic paper P through the imaging lens 1402. The reflecting mirror 1403 is arranged to bend the light from the imaging lens 1402 toward the photographic paper P.

The DMD, the spatial light modulator 104 in the illuminator 1401, includes, for example, movable mirror elements of 16 μm square per element arranged with a 1 μm spacing two dimensionally on a substrate. The ON/OFF of the respective regions of the movable mirror elements is controlled by controlling the rotation of the movable mirror elements. As for the exemplary embodiment, the movable mirror elements in the spatial light modulator 104 are controlled so as to reflect the light from the light source in the illuminator 1401 toward the imaging lens 1402, so that the very small areas on the photographic paper P which correspond to the movable mirror elements are exposed to light.

When the movable mirror elements in the spatial light modulator 104 are controlled so as to reflect the light from the light source in the direction other than that of the imaging lens 1402, the very small areas on the photographic paper P which correspond to the movable mirror elements are not exposed to light. Such control is made for each movable mirror element, so that a specified region 1404 on the photographic paper P is exposed to form a dot image (a latent image).

The spatial light modulator 104 includes movable mirror elements arranged two dimensionally, for example, as a mirror array of 192 scanning lines, so as to be able to expose a plurality of scanning lines, perpendicular to the carrying direction of the photographic paper P, to light at the same time. The photographic paper P is continuously carried in the direction of the arrow A. The spatial light modulator 104 reflects the R-light, G-light, and B-light, which are applied in time sequence, so as to form a color image on the photographic paper P by exposing light to the paper, thereby providing the full color image on the photographic paper P. The details of the operation of the printer of the type that exposes photographic paper are described in, for example, JP-A-2001-133895.

The light source of the illuminator 1401 has the same structure as that of the projector according to the above exemplary embodiments and is controlled as in the above exemplary embodiments, thereby allowing the stabilization of the light intensity of the light source without decreasing efficiency, and thus providing the efficient and stable printer 1400. The optical device according to an aspect of the invention has been described taking a printer as an example, which performs exposure on photographic paper; however, the invention is not limited to the printer. The invention can easily be applied to any optical devices that require illumination light that is bright and uniform in illuminance distribution. For example, the invention may be effectively also applied to a semiconductor exposure device or the like. In the above exemplary embodiments, the solid-state light-emitting element has been described with the LED as an example. However, a semiconductor laser device and an electroluminescent (EL) device or the like may be used.

What is claimed is:

1. A projector, comprising:
   a light source to emit light;
   a spatial light modulator to modulate the light from the light source in accordance with an image signal;
   a light-intensity measuring section to measure light intensity;
   a light-source controller to control the light source; and
   a projector lens to project the light modulated by the spatial light modulator;
   the spatial light modulator including a plurality of movable mirror elements reflecting the light from the light source in a direction of the projector lens or in a direction other than that of the projector lens;
   the light-intensity measuring section including a plurality of light-intensity measuring elements corresponding to a plurality of solid-state light-emitting elements and measuring the light intensity of the light reflected in the direction other than that of the projector lens;
   the plurality of solid-state light-emitting elements including a first color solid-state light-emitting element that emits light in a first wavelength range and a second color solid-state light-emitting element that emits light in a second wavelength range different from the first light wavelength range; and
   the light source controller controlling intensity of light emitted by the first color solid-state light-emitting element and intensity of light emitted by the second color solid-state light-emitting element for each color light in accordance with a signal from the light-intensity measuring section.

2. The projector according to claim 1, wherein the solid-state light-emitting element is one of an LED, a semiconductor laser device, and an electroluminescent device.

3. The projector according to claim 1, wherein
   the light-source controller controls each of the plurality of solid-state light-emitting elements.

4. The projector according to claim 1, further comprising an operation unit for performing a specified calculation based on the signal from the light-intensity measuring section and outputting the calculation to the light-intensity controller.

5. The projector according to claim 3, wherein the operation unit performs the specified calculation using the number of the movable mirror elements reflecting the light from the light source in the direction other than that of the projector lens.

6. The projector according to claim 1, wherein:
   the light source includes a plurality of solid-state light-emitting elements; and
   the light-intensity measuring section includes a plurality of light-intensity measuring elements.

7. The projector according to claim 1, wherein
   the light source and the light-intensity measuring section are substantially conjugated with each other when the movable mirror elements are reflecting the light from the light source in the direction other than that of the projector lens.

8. The projector according to claim 1, wherein
   the light source and the light-intensity measuring section are substantially conjugated with each other when the movable mirror elements are reflecting the light from the light source in the direction other than that of the projector lens.

9. The projector according to claim 1, wherein
the light source includes a plurality of solid-state light-emitting elements; and
the light-intensity controller controls each of the plurality of solid-state light-emitting elements.

10. The projector according to claim 8, further comprising an operation unit for performing a specified calculation based on the signal from the light-intensity measuring section and outputting the calculation to the light-intensity controller.

11. The projector according to claim 10, wherein the operation unit performs the specified calculation using the number of the movable mirror elements reflecting the light from the light source in the direction other than that of the projector lens.

12. A projector, comprising:
a light source to emit light, comprising a plurality of solid-state light-emitting elements;
a spatial light modulator to modulate the light from the light source in accordance with an image signal;
a light-intensity measuring section to measure light intensity;
a light-intensity controller to control the light intensity in accordance with a signal from the light-intensity measuring section; and
a projector lens to project the light modulated by the spatial light modulator;
the spatial light modulator including a plurality of movable mirror elements reflecting the light from the light source in a direction of the projector lens or in a direction other than that of the projector lens; and
the light-intensity measuring section measuring the light intensity of the light reflected in the direction other than that of the projector lens; and
the light-intensity measuring section includes a plurality of light-intensity measuring elements corresponding to the plurality of solid-state light-emitting elements.

13. The projector according to claim 12, wherein
the light-intensity measuring section includes a plurality of light-intensity measuring elements corresponding to the plurality of solid-state light-emitting elements; and
the light-intensity controller controls each of the plurality of solid-state light-emitting elements.

14. The projector according to claim 12, further comprising an operation unit for performing a specified calculation based on the signal from the light-intensity measuring section and outputting the calculation to the light-intensity controller.

15. The projector according to claim 14, wherein the operation unit performs the specified calculation using the number of the movable mirror elements reflecting the light from the light source in the direction other than that of the projector lens.

16. A projector, comprising:
a light source to emit light,
a spatial light modulator to modulate the light from the light source in accordance with an image signal;
a light-intensity measuring section to measure light intensity;
a light-intensity controller to control the light source; and
a projector lens to project the light modulated by the spatial light modulator;
the spatial light modulator including a plurality of movable mirror elements reflecting the light from the light source in a direction of the projector lens or in a direction other than that of the projector lens;
the light-intensity measuring section measuring the light intensity of the light reflected in the direction other than that of the projector lens;
the light source including a plurality of solid-state light-emitting elements;
the light source controller controlling intensity of light emitted by the plurality of solid-state light-emitting elements for each solid-state light-emitting element in accordance with a signal from the light-intensity measuring section; and
the light-intensity measuring section including a plurality of light-intensity measuring elements corresponding to the plurality of solid-state light-emitting elements.

17. A projector, comprising:
a light source to emit light,
a spatial light modulator to modulate the light from the light source in accordance with an image signal;
a light-intensity measuring section to measure light intensity;
a light-intensity controller to control the light source; and
a projector lens to project the light modulated by the spatial light modulator;
the spatial light modulator including a plurality of movable mirror elements reflecting the light from the light source in a direction of the projector lens or in a direction other than that of the projector lens;
the light-intensity measuring section measuring the light intensity of the light reflected in the direction other than that of the projector lens;
the light source including a plurality of solid-state light-emitting elements;
the light source controller controlling intensity of light emitted by the plurality of solid-state light-emitting elements for each solid-state light-emitting element in accordance with a signal from the light-intensity measuring section;
the spatial light modulator has a timing at which all of the plurality of movable mirror elements reflecting the light from the light source in the direction other than that of the projector lens; and
the light-intensity measuring section including a plurality of light-intensity measuring elements corresponding to the plurality of solid-state light-emitting elements that measure the light intensity at the timing.

* * * * *